US012711997B2

(12) United States Patent
Kamezawa et al.

(10) Patent No.: US 12,711,997 B2
(45) Date of Patent: Aug. 18, 2026

(54) DISK DEVICE WITH CONSTRAINED LAYER CONFIGURATIONS BETWEEN INNER AND OUTER COVERS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hideaki Kamezawa, Kawasaki Kanagawa (JP); Hisashi Hasegawa, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/064,241

(22) Filed: Feb. 26, 2025

(65) Prior Publication Data

US 2025/0391440 A1 Dec. 25, 2025

(30) Foreign Application Priority Data

Jun. 21, 2024 (JP) ................................ 2024-100400

(51) Int. Cl.

| | |
|---|---|
| ***G11B 33/08*** | (2006.01) |
| ***G11B 25/04*** | (2006.01) |
| ***G11B 33/02*** | (2006.01) |
| ***G11B 33/12*** | (2006.01) |
| ***G11B 33/14*** | (2006.01) |

(52) U.S. Cl.

CPC ............ *G11B 33/08* (2013.01); *G11B 25/043* (2013.01); *G11B 33/027* (2013.01); *G11B 33/121* (2013.01); *G11B 33/123* (2013.01); *G11B 33/1466* (2013.01)

(58) Field of Classification Search

None

See application file for complete search history.

(56) References Cited

U.S. PATENT DOCUMENTS

| | | | | |
|---|---|---|---|---|
| 6,529,345 B1 | 3/2003 | Butler et al. | | |
| 7,283,323 B2 | 10/2007 | Lee | | |
| 8,854,766 B1 | 10/2014 | Gustafson et al. | | |
| 9,779,779 B1 * | 10/2017 | Okamoto et al. .... | G11B 25/043 | |
| 2001/0015869 A1 * | 8/2001 | Kamezawa et al. . | G11B 33/121 | 360/97.21 |
| 2008/0212237 A1 * | 9/2008 | Uefune et al. ..... | G11B 33/1466 | 360/254 |
| 2011/0038076 A1 * | 2/2011 | Hayakawa et al. .. | G11B 25/043 | 360/97.22 |
| 2025/0095676 A1 * | 3/2025 | Tokizaki ............. | G11B 33/121 | |

* cited by examiner

*Primary Examiner* — Craig A. Renner

(74) *Attorney, Agent, or Firm* — Knobbe, Martens, Olson & Bear, LLP

(57) ABSTRACT

According to one embodiment, a disk device includes a magnetic disk, a housing, a constrained layer, and a first adhesive material. The housing includes a base, a first cover, and a second cover, the base being provided with a housing space in which the magnetic disk is disposed, the first cover being mounted on the base to cover the housing space, the second cover being mounted on the base to cover the first cover. The constrained layer includes a first face and a second face, the first face facing the first cover, the second face being located opposite to the first face, facing the second cover, and being inclined to the first face. The first adhesive material is interposed between the first face and the first cover.

9 Claims, 6 Drawing Sheets

11
24
25
62
16a
22c
22
31a
X
Z
22a
22d
22b
16b
101
16, 61
S
82
81a
64b
31
81c
103
21a
64, 64a, Rd1
81b
G
15, 21
71, 81
73
81d
Rs
63a
32
63, 67
17, 102
Axd
10

11
G, Rd1
101
61
81d
X
Z
S
103
81c
73
81a
71, 81
31
64a
82
81b
17
16, 64
102
16a
64b
63b
16b, 63a
63, 67
10

DISK DEVICE WITH CONSTRAINED LAYER CONFIGURATIONS BETWEEN INNER AND OUTER COVERS

CROSS-REFERENCE TO RELATED APPLICATIONS

This application is based upon and claims the benefit of priority from Japanese Patent Application No. 2024-100400, filed on Jun. 21, 2024; the entire contents of which are incorporated herein by reference.

FIELD

Embodiments described herein relate generally to a disk device.

BACKGROUND

A disk device, such as a hard disk drive (HDD), includes a magnetic disk, a magnetic head that reads and writes information from/to the magnetic disk, and a housing that houses a variety of parts. Furthermore, in a certain type of disk device, the housing includes a base, a first cover that covers a space inside the base, and a second cover that covers the first cover.

The disk device may further include a damper. The damper is disposed, for example, in a clearance between the first cover and the second cover. The damper includes a constrained layer, and an adhesive material that is used to mount the constrained layer on the first cover. The damper damps vibration by using deformation of the adhesive material.

The constrained layer is mounted on the first cover to perpendicularly protrude from a surface of the first cover in some cases. In this case, there is a space surrounded by a side face of the constrained layer, the surface of the first cover, and the second cover. Gas in the space expands or contracts, and therefore stress may be applied to the second cover.

DETAILED DESCRIPTION

According to one embodiment, a disk device includes a magnetic disk, a housing, a constrained layer, and a first adhesive material. The housing includes a base that is provided with a housing space where the magnetic disk is disposed, a first cover that is mounted on the base to cover the housing space, and a second cover that is mounted on the base to cover the first cover. The constrained layer includes a first face that faces the first cover, and a second face that is located opposite to the first face, faces the second cover, and is inclined to the first face. The first adhesive material is interposed between the first face and the first cover.

One embodiment will be described below with reference to FIGS. 1 to 6. Note that herein, components according to the embodiment and the description of the components are expressed in plural ways in some cases. The components and the description thereof are provided by way of example, and are not limited to the expressions herein. The components can also be specified by terms that are different from the terms herein. Furthermore, the components can be described by using expressions that are different from the expressions herein.

In the description below, to "prevent" is defined as, for example, to avoid the occurrence or exhibition of a phenomenon, an effect, or an influence or to reduce a level or degree of the phenomenon, the effect, or the influence.

Figure 1:
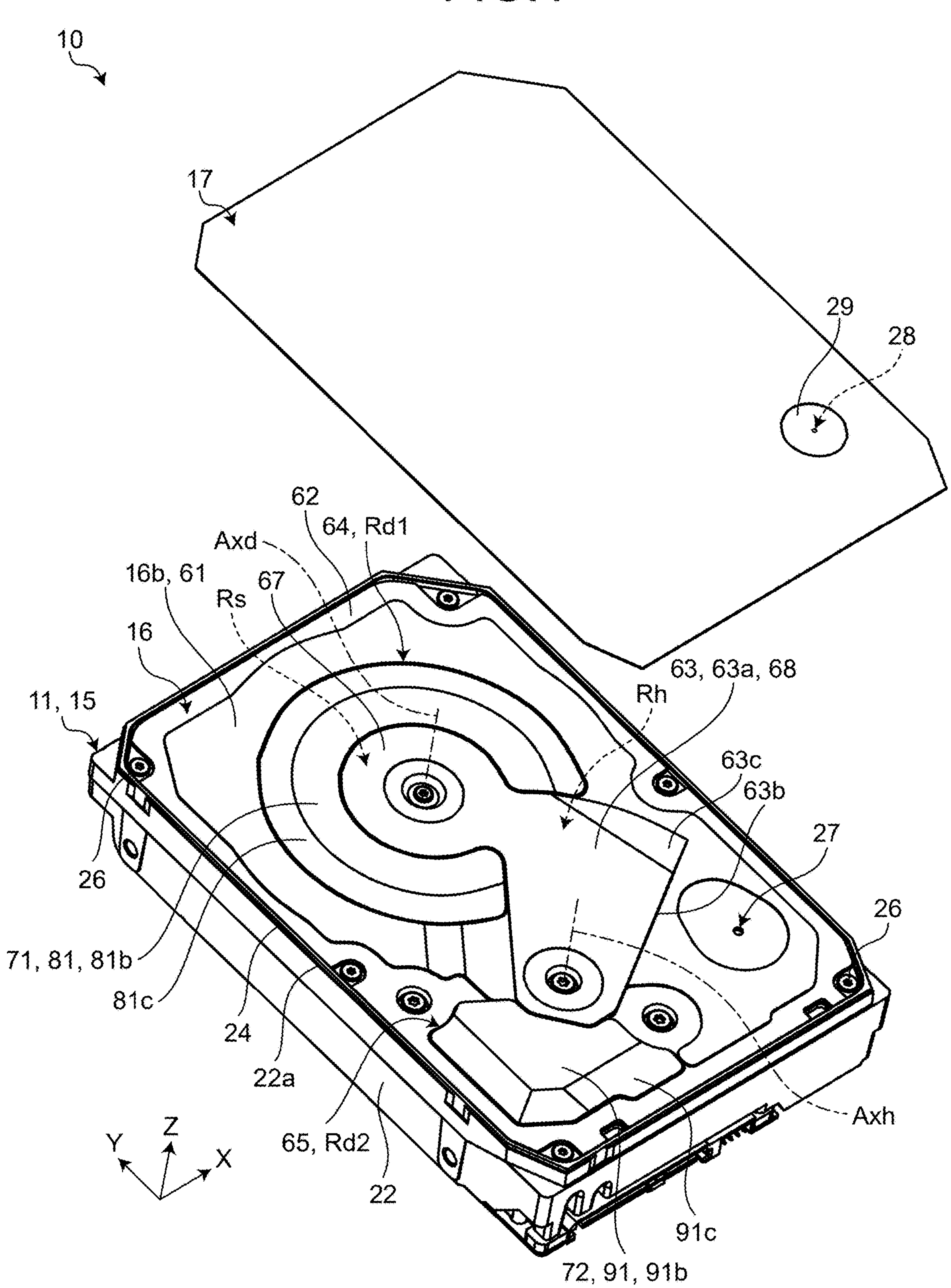
FIG. 1 is an exemplary perspective view illustrating an HDD according to an embodiment in an exploded manner.

FIG. 1 is an exemplary perspective illustrating a hard disk drive (HDD) 10 according to the present embodiment in an exploded manner. The HDD 10 is an example of a disk device, and can also be referred to as an electronic device, a memory device, an external memory device, or a magnetic disk device.

As illustrated in respective drawings, herein, an X axis, a Y axis, and a Z axis are defined for convenience's sake. The X axis, the Y axis, and the Z axis are orthogonal to each other. The X axis is provided along a width of the HDD 10. The Y axis is provided along a length of the HDD 10. The Z axis is provided along a thickness of the HDD 10.

Moreover, herein, an X direction, a Y direction, and a Z direction are defined. The X direction is a direction along the X axis, and includes a +X direction indicated by an arrow of the X axis, and a −X direction, which is an opposite direction of the arrow of the X axis. The Y direction is a direction along the Y axis, and includes a +Y direction indicated by an arrow of the Y axis, and a −Y direction, which is an opposite direction of the arrow of the Y axis. The Z direction is a direction along the Z axis, and includes a +Z direction indicated by an arrow of the Z axis, and a −Z direction, which is an opposite direction of the arrow of the Z axis.

As illustrated in FIG. 1, the HDD 10 includes a housing 11 that houses a variety of parts. The housing 11 includes a base 15, an inner cover 16, and an outer cover 17. The inner cover 16 is an example of a first cover. The outer cover 17 is an example of a second cover.

The base 15 and the outer cover 17 are made of, for example, metal such as an aluminum alloy. The inner cover 16 is made of, for example, metal such as non-magnetic stainless steel. Stated another way, the base 15, the inner cover 16, and the outer cover 17 are non-magnetic materials. Note that the base 15, the inner cover 16, and the outer cover 17 may be made of another material, or may be ferromagnetic.

The base 15 is a bottomed container that is open in the +Z direction. The base 15 extends in the Y direction. In other words, a length in the Y direction of the base 15 is greater than a length in the X direction of the base 15, and is greater than a length in the Z direction of the base 15.

Figure 2:
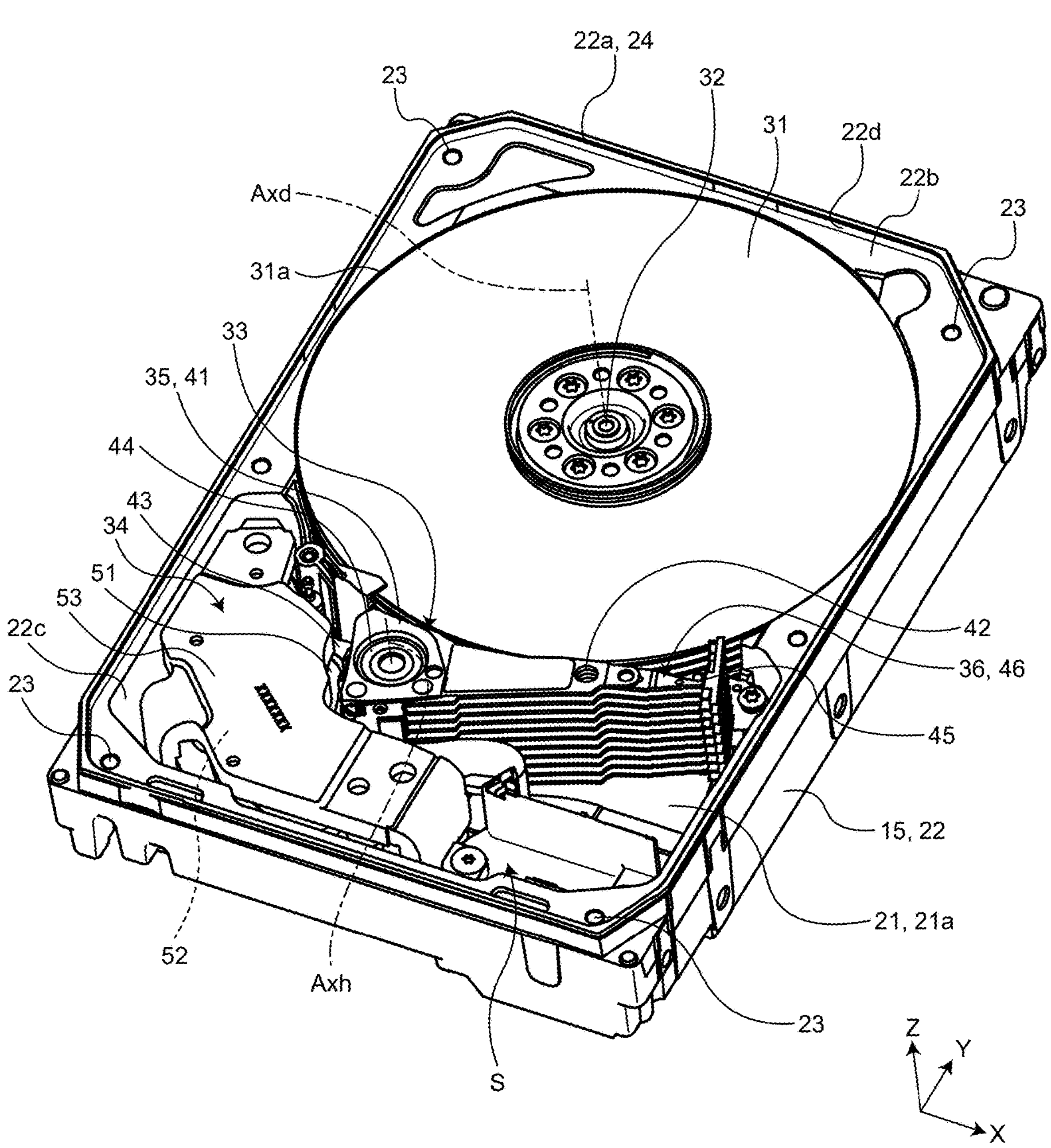
FIG. 2 is an exemplary perspective view illustrating the HDD according to the embodiment described above from which an inner cover and an outer cover have been removed.

FIG. 2 is an exemplary perspective view illustrating the HDD 10 according to the present embodiment from which the inner cover 16 and the outer cover 17 have been removed. As illustrated in FIG. 2, the base 15 includes a bottom wall 21 and a side wall 22.

The bottom wall 21 is formed in a roughly rectangular (quadrangular) plate shape that extends along an X-Y plane. The bottom wall 21 includes a bottom face 21*a*. The bottom face 21*a* is directed in a roughly +Z direction as a whole. Note that the bottom face 21*a* may have unevenness.

The side wall 22 protrudes from an edge of the bottom face 21*a* in the roughly +Z direction. The side wall 22 is formed in a roughly rectangular frame shape. The bottom face 21*a* and the frame-shaped side wall 22 form (define or partition) a housing space S inside the base 15. In other words, the housing space S is provided inside the bottom face 21*a* and the side wall 22 of the base 15. The housing space S opens outside the base 15 at an end of the base 15 in the +Z direction.

Figure 3:
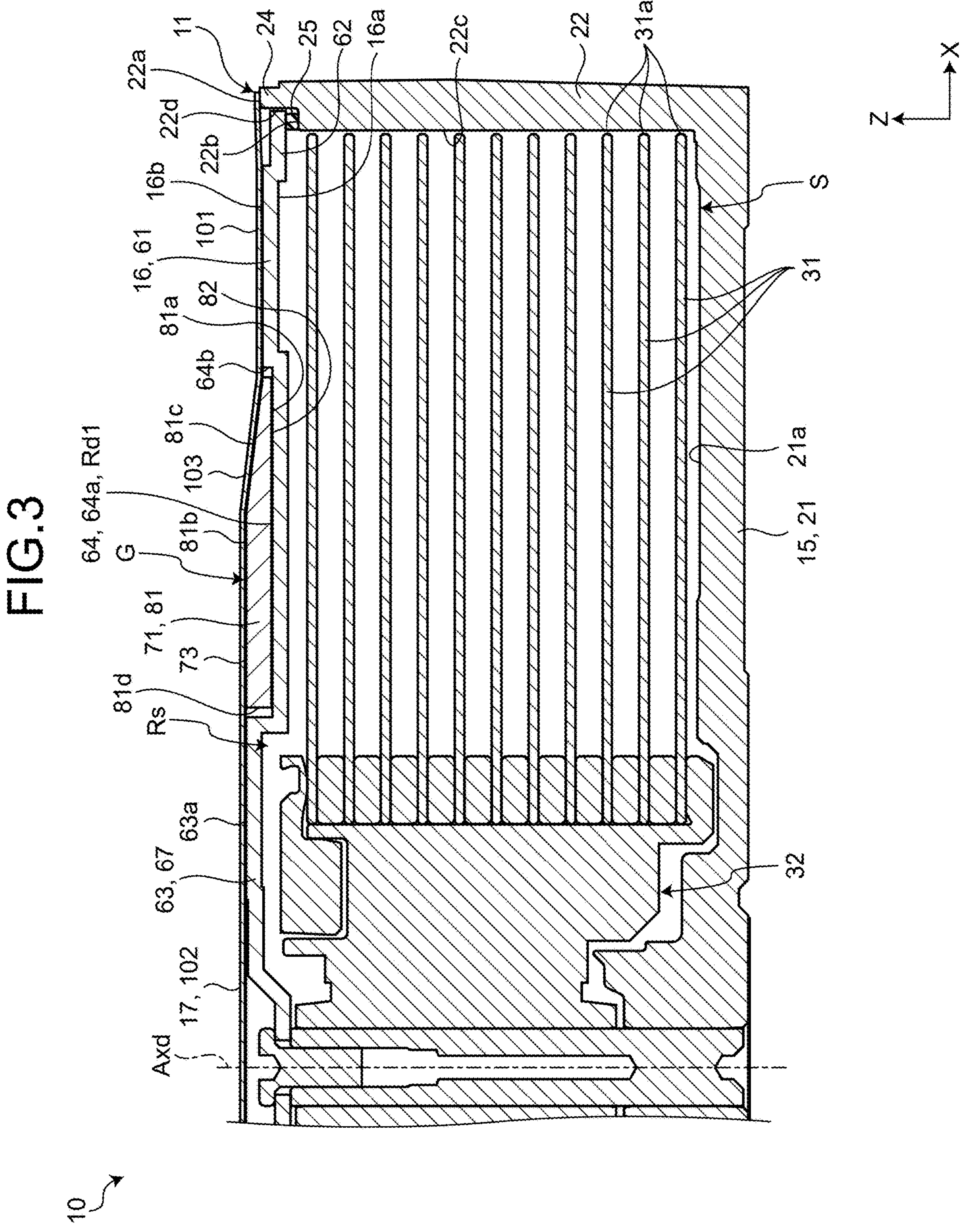
FIG. 3 is an exemplary sectional view illustrating a portion of the HDD according to the embodiment described above.

FIG. 3 is an exemplary sectional view illustrating a portion of the HDD 10 according to the present embodiment. As illustrated in FIG. 3, the side wall 22 includes an end face 22*a*, a mounting face 22*b*, an inner face 22*c*, and an intermediate face 22*d*. Note that the side wall 22 is not limited to this example.

The end face 22*a* is provided at an end of the side wall 22 in the +Z direction. The end face 22*a* is formed to be roughly flat, and is directed in the roughly +Z direction. The end face 22*a* is formed in a roughly rectangular frame shape. In other words, the end face 22*a* is endlessly formed.

The mounting face 22*b* is surrounded by the end face 22*a* on a plane of projection in the Z direction. The mounting face 22*b* is, in the Z direction, located near the end face 22*a* and is closer to the bottom face 21*a* than the end face 22*a*. In other words, the mounting face 22*b* is recessed from the end face 22*a* in a roughly −Z direction.

The mounting face 22*b* is formed to be roughly flat, and is directed in the roughly +Z direction. The mounting face 22*b* is formed in a roughly rectangular frame shape. Note that the mounting face 22*b* is not limited to this example. As illustrated in FIG. 2, the mounting face 22*b* is provided with a plurality of screw holes 23.

As illustrated in FIG. 3, the inner face 22*c* is provided between an inner edge of the mounting face 22*b* and the bottom face 21*a*. The inner face 22*c* faces inside the housing space S. The intermediate face 22*d* is provided between an inner edge of the end face 22*a* and an outer edge of the mounting face 22*b*.

Stated another way, the side wall 22 includes a rib 24 that protrudes from the mounting face 22*b* in the roughly +Z direction. The rib 24 is formed in a roughly rectangular frame shape. The rib 24 includes the end face 22*a* and the intermediate face 22*d*.

The housing 11 further includes a gasket 25. The inner cover 16 is supported by the mounting face 22*b* of the side wall 22, for example, with the gasket 25 interposed therebetween. The gasket 25 airtightly seals a gap between the mounting face 22*b* and the inner cover 16.

As illustrated in FIG. 1, the housing 11 further includes a plurality of screws 26. The screws 26 penetrate the inner cover 16, and are fitted into the screw holes 23. Stated another way, the inner cover 16 is mounted on the mounting face 22*b* by using the screws 26. This causes the inner cover 16 to be mounted on the base 15 in such a way that the housing space S is almost airtightly covered.

As illustrated in FIG. 3, the outer cover 17 covers the inner cover 16 to have a clearance G, and is supported by the end face 22*a*. In other words, the clearance G is provided between the inner cover 16 and the outer cover 17. In the present embodiment, the entire circumference of an edge of the outer cover 17 is welded to the end face 22*a* of the side wall 22 of the base 15. This causes the outer cover 17 to be mounted on the base 15 in such a way that the housing space S and the clearance G are airtightly covered. Stated another way, the inner cover 16 and the outer cover 17 seal the housing space S.

The outer cover 17 may be coupled to another portion of the base 15. For example, the outer cover 17 may include a portion that surrounds the side wall 22, and may be coupled to the side wall 22 in the portion. Furthermore, the outer cover 17 may be mounted on the base 15 by using another method such as adhesion.

As illustrated in FIG. 1, the inner cover 16 is provided with a vent hole 27. The vent hole 27 is an example of a first vent hole. The vent hole 27 penetrates the inner cover 16 in a roughly Z direction, and causes the housing space S to communicate with the clearance G.

The outer cover 17 is provided with a vent hole 28. The vent hole 28 is an example of a second vent hole. The vent hole 28 penetrates the outer cover 17 in the roughly Z direction, and causes the clearance G to communicate with the outside of the housing 11.

In assembling the HDD 10, air is let out of the housing space S and the clearance G through the vent holes 27 and 28. Moreover, the housing space S and the clearance G are filled with gas that is different from air. Examples of the gas with which the housing space S and the clearance G are filled include low density gas that is less dense than air, and inert gas having low reactivity. For example, the housing space S and the clearance G are filled with helium. Note that the housing space S may be filled with another fluid.

The housing 11 further includes a seal 29. The seal 29 is an example of a sealing material. The seal 29 is stuck on the outer cover 17, and covers the vent hole 28. The seal 29 airtightly seals the vent hole 28, and prevents gas with which the housing space S has been filled from leaking out through the vent holes 27 and 28.

As illustrated in FIG. 2, the HDD 10 further includes a plurality of magnetic disks 31, a spindle motor 32, a head stack assembly (HSA) 33, and a voice coil motor (VCM) 34.

The magnetic disks 31, the spindle motor 32, the HSA 33, and the VCM 34 are disposed in the housing space S. Therefore, the bottom face 21*a* of the base 15 faces the magnetic disks 31, the spindle motor 32, the HSA 33, and the VCM 34. Moreover, the side wall 22 surrounds the magnetic disks 31, the spindle motor 32, the HSA 33, and the VCM 34.

The magnetic disks 31 are, for example, recording media that are provided with a magnetic recording layer on the upper face and the lower face. The diameter of the magnetic disks 31 is, for example, 3.5 inches. Note that the magnetic disks 31 are not limited to this example.

As illustrated in FIG. 3, the magnetic disks 31 are disposed along the X-Y plane. The plurality of magnetic disks 31 overlap each other while being spaced apart from each other in the roughly Z direction. The HDD 10 according to the present embodiment includes ten or more magnetic disks 31 that are arranged in the Z direction. Note that the number of magnetic disks 31 is not limited to this example.

The spindle motor 32 supports the plurality of magnetic disks 31, and rotates the plurality of magnetic disks 31 around a central axis Axd. The central axis Axd is an example of a first rotation axis. The central axis Axd is a central axis of the magnetic disks 31, and is also a central axis of rotation of the magnetic disks 31.

The plurality of magnetic disks 31 are held by a hub of the spindle motor 32 by using, for example, a clamp spring. The spindle motor 32 is mounted on, for example, the bottom wall 21 of the base 15, and is also supported by the inner cover 16.

As illustrated in FIG. 2, the HSA 33 includes a carriage 35 and a plurality of head gimbal assemblies (HGA) 36. The carriage 35 includes an actuator block 41, a plurality of arms 42, and a holder 43.

Figure 4:
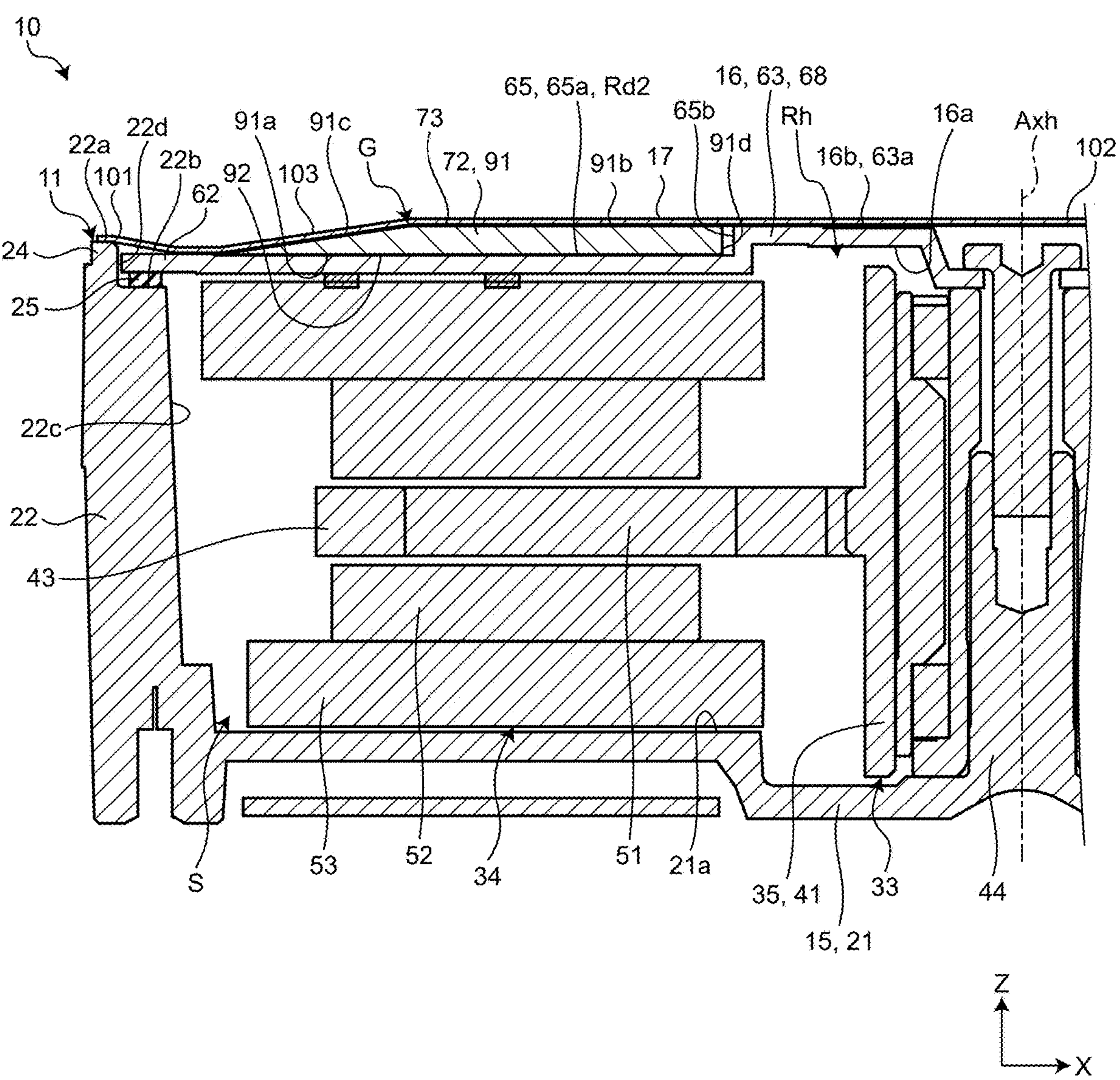
FIG. 4 is an exemplary sectional view illustrating another portion of the HDD according to the embodiment described above.

FIG. 4 is an exemplary sectional view illustrating another portion of the HDD 10 according to the present embodiment. A support shaft 44 is provided, for example, in a position that is separated from the magnetic disks 31 in a direction that is roughly orthogonal to the Z direction. As illustrated in FIG. 4, the support shaft 44 extends from the bottom wall 21 in the roughly +Z direction, and is supported by the inner cover 16.

The actuator block 41 is mounted on the support shaft 44 in a rotatable manner around a central axis Axh by using, for example, a bearing. The central axis Axh is an example of a second rotation axis. The central axis Axh is a central axis of the support shaft 44, and is also a central axis of rotation of the carriage 35. The central axis Axd and the central axis Axh extend in parallel in the roughly Z direction.

The plurality of arms 42 illustrated in FIG. 2 protrudes roughly in parallel from the actuator block 41 in a direction that is roughly orthogonal to the Z direction. The plurality of arms 42 is arranged to be spaced apart from each other in the Z direction. Each of the plurality of arms 42 is formed in a plate shape that can enter between two adjacent magnetic disks of the plurality of magnetic disks 31. The holder 43 protrudes from the actuator block 41 in a direction that is opposite to the direction of the arms 42.

Each of the plurality of HGAs 36 includes a magnetic head 45 and a suspension 46. The magnetic head 45 can also be referred to as a slider. The magnetic head 45 records and reproduces information in/from the recording layer of the magnetic disk 31. In other words, the magnetic head 45 reads and writes information from/to the magnetic disk 31.

The suspension 46 includes, for example, a base plate, a lad beam that extends from the base plate, and a flexure that is mounted on the base plate and the load beam. The flexure is one type of flexible printed circuit board (FPC).

The base plate is mounted at a distal end of the arm 42. The magnetic head 45 is implemented on the flexure. This causes the magnetic head 45 to be mounted on the suspension 46. Moreover, the suspension 46 is mounted on the carriage 35.

The VCM 34 includes a coil 51, a magnet 52, and a yoke 53. The coil 51 is held by the holder 43 of the carriage 35. The magnet 52 is, for example, a permanent magnet, and is mounted on the base 15 by using the yoke 53.

When a current has been applied to the coil 51, electromagnetic force generated by a current of the coil 51 and a magnetic field of the magnet 52 causes the carriage 35 to rotate around the support shaft 44. As described above, the VCM 34 rotates the carriage 35 around the central axis Axh. This causes the carriage 35 to move the magnetic head 45 around the central axis Axh by using the suspension 46.

As illustrated in FIG. 3, the inner cover 16 includes an inner face 16*a* and an outer face 16*b*. The inner face 16*a* forms (defines or partitions) the housing space S together with the bottom face 21*a* of the bottom wall 21 and the inner face 22*c* of the side wall 22. The inner face 16*a* is directed in the roughly −Z direction as a whole. For example, the inner face 16*a* faces the magnetic disk 31, the spindle motor 32, the HSA 33, and the VCM 34. The outer face 16*b* is located opposite to the inner face 16*a*. The outer face 16*b* is directed in the roughly +Z direction as a whole.

As illustrated in FIG. 1, the inner cover 16 includes a base 61, a peripheral portion 62, a central portion 63, and two mounting portions 64 and 65. Each of the base 61, the peripheral portion 62, the central portion 63, and the mounting portions 64 and 65 is a portion of the inner cover 16, and partially includes the inner face 16*a* and the outer face 16*b*.

Thicknesses of the base 61, the peripheral portion 62, the central portion 63, and the mounting portions 64 and 65 are roughly constant. For example, press working is performed to bend the inner cover 16, and therefore the base 61, the peripheral portion 62, the central portion 63, and the mounting portions 64 and 65 are formed. Note that the thicknesses of the base 61, the peripheral portion 62, the central portion 63, and the mounting portions 64 and 65 may be different from each other.

The base 61 is surrounded by the peripheral portion 62, and surrounds the central portion 63. In other words, the base 61 is provided between the peripheral portion 62 and the central portion 63. Note that the peripheral portion 62 and the central portion 63 may be adjacent to each other.

The peripheral portion 62 is formed in a roughly rectangular frame shape. As illustrated in FIG. 3, the inner face 16*a* of the peripheral portion 62 is supported by the mounting face 22*b* of the side wall 22 with the gasket 25 interposed therebetween. The peripheral portion 62 is mounted on the side wall 22 by using the screws 26.

The peripheral portion 62 protrudes from an edge of the base 61 toward the mounting face 22*b* in the roughly −Z direction. Therefore, a distance between the bottom face 21*a* of the bottom wall 21 and the peripheral portion 62 is shorter than a distance between the bottom face 21*a* and the base 61.

The central portion 63 is located roughly at the center of the inner cover 16. The central portion 63 protrudes from the base 61 toward the outer cover 17 in the roughly +Z direction. Therefore, a distance between the bottom face 21*a* of the bottom wall 21 and the central portion 63 is longer than a distance between the bottom face 21*a* and the base 61.

As illustrated in FIG. 1, the central portion 63 includes, for example, a circular portion 67 and a fan-shaped portion 68. The circular portion 67 is a roughly annular portion that is provided around the central axis Axd. The fan-shaped portion 68 is a roughly fan-shaped portion with the vicinity of the central axis Axh as a center.

As illustrated in FIG. 3, the circular portion 67 projects from the base 61 in the +Z direction to define a recess Rs that is recessed from the inner face 16*a* of the base 61 in the +Z direction. A portion of the spindle motor 32 is housed in the recess Rs. Stated another way, the circular portion 67 can enlarge, in the Z direction, a portion where the spindle motor 32 is disposed of the housing space S.

As illustrated in FIG. 4, the fan-shaped portion 68 projects from the base 61 in the +Z direction to form (define or partition) a recess Rh that is recessed from the inner face 16*a* of the base 61 in the +Z direction. A portion of the HSA 33 is housed in the recess Rh. Stated another way, the fan-shaped portion 68 can enlarge, in the Z direction, a portion where the HSA 33 is disposed of the housing space S.

As illustrated in FIG. 1, the outer face 16*b* of the central portion 63 includes a flat face 63*a*, an end face 63*b*, and an inclined surface 63*c*. The flat face 63*a* is formed to be flat, and is directed in the roughly +Z direction. The end face 63*b* and the inclined surface 63*c* extend between an edge of the flat face 63*a* and the outer face 16*b* of the base 61.

The end face 63*b* extends from the edge of the flat face 63*a* in the roughly −Z direction. On the other hand, the inclined surface 63*c* extends from the edge of the flat face 63*a* obliquely relative to the flat face 63*a*. The inclined surface 63*c* extends from the edge of the flat face 63*a*, for example, in such a way that a distance between the inclined surface 63*c* of the central portion 63 and the bottom face 21*a* of the bottom wall 21 decreases toward the side wall 22.

The inclined surface 63*c* is connected to an outer end of the flat face 63*a* of the fan-shaped portion 68 in the radial direction that is orthogonal to the central axis Axh. Note that the inclined surface 63*c* is not limited to this example, and may be provided in another position, or may be omitted.

The mounting portion 64 is provided between the base 61 and the circular portion 67 of the central portion 63. As illustrated in FIG. 3, the mounting portion 64 projects from the base 61 toward the bottom wall 21 in the roughly −Z direction. Therefore, a distance between the bottom face 21*a* of the bottom wall 21 and the mounting portion 64 is shorter than a distance between the bottom face 21*a* and the base 61.

Figure 5:
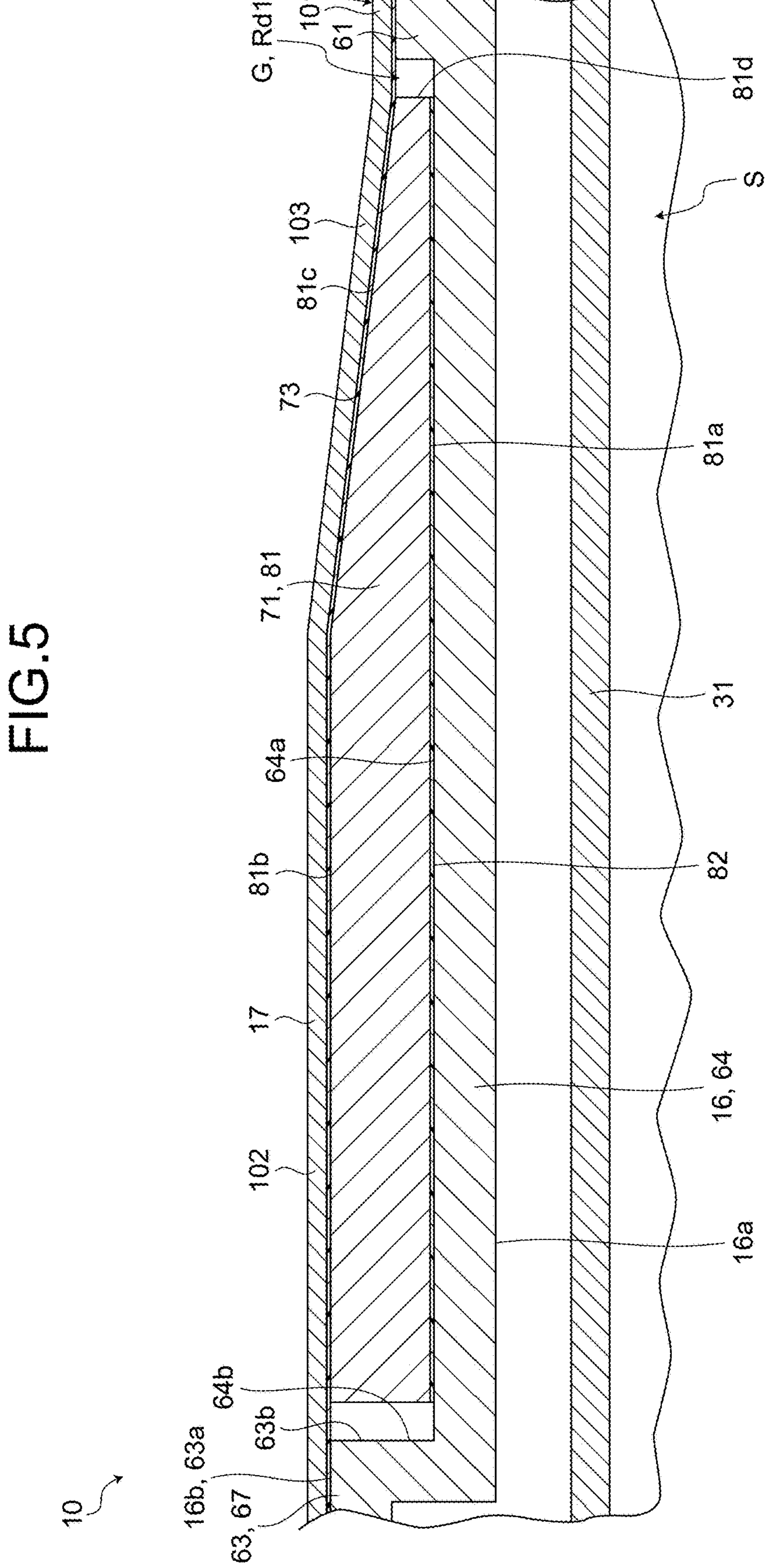
FIG. 5 is an exemplary sectional view illustrating a portion near a mounting portion of the HDD according to the embodiment described above.

FIG. 5 is an exemplary sectional view illustrating a portion near the mounting portion 64 of the HDD 10 according to the present embodiment. As illustrated in FIG. 5, the mounting portion 64 projects from the base 61 in the −Z direction to define a recess Rd1 that is recessed from the outer face 16*b* of the base 61 in the −Z direction. The recess Rd1 is included in the clearance G. The mounting portion 64 and the recess Rd1 extend around the central axis Axd, and overlap the magnetic disk 31 in the Z direction along the central axis Axd.

The outer face 16*b* of the mounting portion 64 includes a bottom face 64*a* and a side face 64*b*. The bottom face 64*a* and the side face 64*b* define the recess Rd1. The bottom face 64*a* is provided in a bottom of the recess Rd1 in the −Z direction. The bottom face 64*a* is formed to be flat, and is directed in the roughly +Z direction. The side face 64*b* extends from an edge of the bottom face 64*a* in the roughly +Z direction, is connected to the outer face 16*b* of the base 61, and is also connected to the flat face 63*a* via the end face 63*b* of the central portion 63. The side face 64*b* and the end face 63*b* of the central portion 63 are continuous to each other.

As illustrated in FIG. 1, the mounting portion 65 is provided between the peripheral portion 62 and the fan-shaped portion 68 of the central portion 63. The mounting portion 65 projects from the base 61 toward the bottom wall 21 in the roughly −Z direction. Therefore, a distance between the bottom face 21*a* of the bottom wall 21 and the mounting portion 65 is shorter than a distance between the bottom face 21*a* of the base 61.

Figure 6:
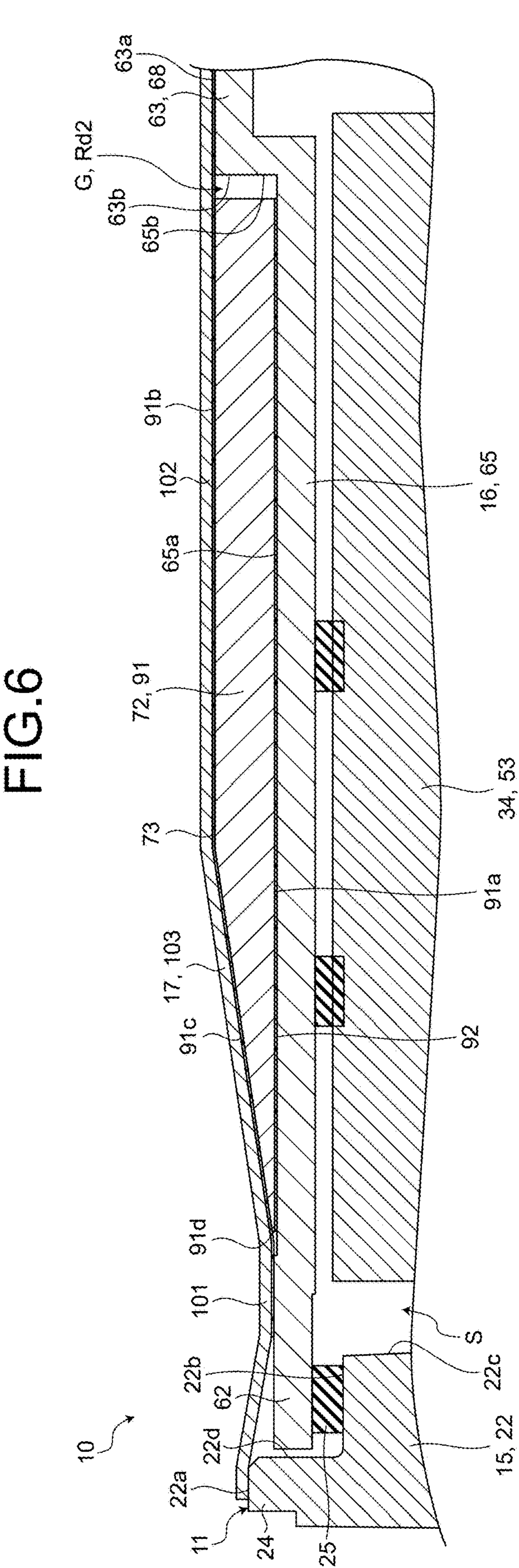
FIG. 6 is an exemplary sectional view illustrating a portion near another mounting portion of the HDD according to the embodiment described above.
Figure 6:
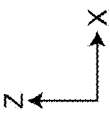

FIG. 6 is an exemplary sectional view illustrating a portion near the mounting portion 65 of the HDD 10 according to the present embodiment. As illustrated in FIG. 6, the mounting portion 65 projects from the base 61 in the −Z direction to define a recess Rd2 that is recessed from the outer face 16*b* of the base 61 in the −Z direction. The recess Rd2 is included in the clearance G. The mounting portion 65 and the recess Rd2 overlap the VCM 34 in a direction along the central axis Axh.

The outer face 16*b* of the mounting portion 65 includes a bottom face 65*a* and a side face 65*b*. The bottom face 65*a* and the side face 65*b* define the recess Rd2. The bottom face 65*a* is provided in a bottom of the recess Rd2 in the −Z direction. The bottom face 65*a* is formed to be flat, and is directed in the roughly +Z direction. The side face 65*b* extends from an edge of the bottom face 65*a* in the roughly +Z direction, is connected to the outer face 16*b* of the base 61, and is also connected to the flat face 63*a* via the end face 63*b* of the central portion 63. The side face 65*b* and the end face 63*b* of the central portion 63 are continuous to each other.

As illustrated in FIGS. 5 and 6, the HDD 10 according to the present embodiment further includes two dampers 71 and 72, and a double-sided tape 73. The double-sided tape 73 is an example of a second adhesive material. Note that the second adhesive material may be another adhesive material such as an adhesive. The dampers 71 and 72 are disposed in the clearance G between the inner cover 16 and the outer cover 17. A portion of the damper 71 is disposed in the recess Rd1. A portion of the damper 72 is disposed in the recess Rd2.

As illustrated in FIG. 5, the damper 71 includes a constrained layer 81 and a viscoelastic material (VEM) 82. Note that the damper 71 is not limited to this example. The constrained layer 81 can also be referred to as a vibration damping plate. The viscoelastic material 82 is an example of a first adhesive material. Note that the first adhesive material may be another adhesive material such as an adhesive.

The constrained layer 81 is made of, for example, metal such as ferromagnetic stainless steel. For example, the constrained layer 81 is made of SUS 430. Note that the constrained layer 81 may be made of another ferromagnetic material, or may be a non-magnetic material.

The constrained layer 81 is disposed in the clearance G, and is formed in a plate shape that is disposed along the X-Y plane. At least a portion of the constrained layer 81 is disposed in the recess Rd1. The constrained layer 81 includes a bottom face 81*a*, a flat face 81*b*, an inclined surface 81*c*, and an end face 81*d*. The bottom face 81*a* is an example of a first face. The inclined surface 81*c* is an example of a second face.

The bottom face 81*a* is formed to be flat, and is directed in the roughly −Z direction. The bottom face 81*a* faces the bottom face 64*a* of the mounting portion 64 of the inner cover 16. The bottom face 81*a* and the bottom face 64*a* are roughly in parallel to each other. Note that the bottom face 81*a* may be inclined to the bottom face 64*a*.

The flat face 81*b* and the inclined surface 81*c* are located opposite to the bottom face 81*a*, and face the outer cover 17. The flat face 81*b* is formed to be flat, and is directed in the roughly +Z direction. The inclined surface 81*c* is slated relative to the bottom face 81*a*.

The end face 81*d* is provided at an end in a direction along the bottom face 81*a* in the constrained layer 81. The end face 81*d* is roughly orthogonal to the bottom face 81*a*. The end face 81*d* is provided between the bottom face 81*a* and the flat face 81*b*, and is also provided between the bottom face 81*a* and the inclined surface 81*c*. Stated another way, the end face 81*d* is connected to the inclined surface 81*c*. Note that, between the bottom face 81*a* and the inclined surface 81*c*, the end face 81*d* may be an edge.

The viscoelastic material 82 is disposed in the recess Rd1 of the clearance G, and is interposed between the bottom face 81*a* of the constrained layer 81 and the bottom face 64*a* of the mounting portion 64 of the inner cover 16. Therefore, the viscoelastic material 82 causes the constrained layer 81 to be mounted on the inner cover 16.

On a plane of projection in the Z direction, respective shapes of the constrained layer 81 and the viscoelastic material 82 are roughly equal to a shape of the recess Rd1. Therefore, the constrained layer 81 and the viscoelastic material 82 extend around the central axis Axd, and overlap the magnetic disk 31 in the Z direction along the central axis Axd.

Each of the flat face 81*b* and the inclined surface 81*c* of the constrained layer 81 extends around the central axis Axd. The inclined surface 81*c* is provided between an outer edge of the flat face 81*b* in the radial direction that is orthogonal to the central axis Axd and the end face 81*d*. Therefore, the inclined surface 81*c* is a roughly conic curved surface that extends around the central axis Axd. Note that the inclined surface 81*c* is not limited to this example.

The inclined surface 81*c* is inclined to the bottom face 81*a* in such a way that a distance between the bottom face 81*a* and the inclined surface 81*c* (a thickness of the constrained layer 81) decreases outward in the radial direction that is orthogonal to the central axis Axd. Stated another way, the inclined surface 81*c* is inclined to the bottom face 81*a* in such a way that the distance between the bottom face 81*a* and the inclined surface 81*c* decreases toward the side wall 22. Stated yet another way, the inclined surface 81*c* is inclined to the bottom face 81*a* in such a way that the distance between the bottom face 81*a* and the inclined surface 81*c* decreases toward the end face 81*d*.

The outer diameters of the mounting portion 64, the recess Rd1, and the constrained layer 81 are smaller than the outer diameter of the magnetic disk 31. Therefore, the mounting portion 64 is separated inward in the radial direction that is orthogonal to the central axis Axd from the outer edge 31*a* of the magnetic disk 31 in the radial direction. For example, the base 61 or the peripheral portion 62 overlaps the edge 31*a* of the magnetic disk 31 in a direction along the central axis Axd. The outer diameters are distances between the central axis Axd and outer edges of the mounting portion 64, the recess Rd1, and the constrained layer 81 in the radial direction.

The end face 81*d* of the constrained layer 81 and the side face 64*b* of the mounting portion 64 face each other to be spaced apart from each other. The flat face 63*a* of the central portion 63 and the flat face 81*b* of the constrained layer 81 are disposed on roughly the same plane. In other words, the flat face 63*a* of the central portion 63 and the flat face 81*b* of the constrained layer 81 are disposed to be roughly continuous to each other.

In the Z direction along the central axis Axd, an outer end of the inclined surface 81*c* in the radial direction that is orthogonal to the central axis Axd and the outer face 16*b* of the base 61 are disposed in roughly the same position (height). Therefore, the outer face 16*b* of the base 61 and the inclined surface 81*c* of the constrained layer 81 are disposed to be roughly continuous to each other. In other words, the outer face 16*b* and the inclined surface 81*c* are substantially connected to each other in such a way that an angle between the outer face 16*b* and the inclined surface 81*c* is an obtuse angle.

As illustrated in FIG. 1, the inclined surface 81*c* of the constrained layer 81 and the inclined surface 63*c* of the central portion 63 of the inner cover 16 are adjacent to each other around the central axis Axd. An angle between the outer face 16*b* of the base 61 and the inclined surface 63*c* is roughly equal to the angle between the outer face 16*b* of the base 61 and the inclined surface 81*c*. Note that the inclined surfaces 63*c* and 81*c* are not limited to this example.

As illustrated in FIG. 6, the damper 72 includes a constrained layer 91 and a viscoelastic material 92. Note that the damper 72 is not limited to this example. The viscoelastic material 92 is an example of the first adhesive material.

The constrained layer 91 is made of, for example, metal such as ferromagnetic stainless steel. Note that the constrained layer 91 may be made of another ferromagnetic material, or may be a non-magnetic material. Furthermore, a material of the constrained layer 81 and a material of the constrained layer 91 may be different from each other.

The constrained layer 91 is disposed in the clearance G, and is formed in a plate shape that is disposed along the X-Y plane. At least a portion of the constrained layer 91 is disposed in the recess Rd2. The constrained layer 91 includes a bottom face 91*a*, a flat face 91*b*, an inclined surface 91*c*, and an end face 91*d*. The bottom face 91*a* is an example of the first face. The inclined surface 91*c* is an example of the second face.

The bottom face 91*a* is formed to be flat, and is directed in the roughly −Z direction. The bottom face 91*a* faces the bottom face 65*a* of the mounting portion 65 of the inner cover 16. The bottom face 91*a* and the bottom face 65*a* are roughly in parallel to each other. Note that the bottom face 91*a* may be inclined to the bottom face 65*a*.

The flat face 91*b* and the inclined surface 91*c* are located opposite to the bottom face 91*a*, and face the outer cover 17. The flat face 91*b* is formed to be flat, and is directed in the roughly +Z direction. The inclined surface 91*c* is inclined to the bottom face 91*a*.

The end face 91*d* is provided at an end in a direction along the bottom face 91*a* in the constrained layer 91. The end face 91*d* is roughly orthogonal to the bottom face 91*a*. The end face 91*d* is provided between the bottom face 91*a* and the flat face 91*b*, and is also provided between the bottom face 91*a* and the inclined surface 91*c*.

The viscoelastic material 92 is disposed in the recess Rd2 of the clearance G, and is interposed between the bottom face 91*a* of the constrained layer 91 and the bottom face 65*a* of the mounting portion 65 of the inner cover 16. Therefore, the viscoelastic material 92 causes the constrained layer 91 to be mounted on the inner cover 16.

On a plane of projection in the Z direction, respective shapes of the constrained layer 91 and the viscoelastic material 92 are roughly equal to a shape of the recess Rd2. The constrained layer 91 and the viscoelastic material 92 overlap the VCM 34 in the Z direction along the central axis Axh.

The inclined surface 91*c* is inclined to the bottom face 91*a* in such a way that a distance between the bottom face 91*a* and the inclined surface 91*c* decreases toward the side wall 22. Stated another way, the inclined surface 91*c* is inclined to the bottom face 91*a* in such a way that the distance between the bottom face 91*a* and the inclined surface 91*c* decreases toward the end face 91*d*.

The end face 91*d* of the constrained layer 91 and the side face 65*b* of the mounting portion 65 face each other to be spaced apart from each other. The flat face 63*a* of the central portion 63 and the flat face 91*b* of the constrained layer 91 are disposed on roughly the same plane. In other words, the flat face 63*a* of the central portion 63 and the flat face 91*b* of the constrained layer 91 are disposed to be roughly continuous to each other.

In the Z direction along the central axis Axh, an end of the inclined surface 91*c* that is connected to the end face 91*d* and the outer face 16*b* of the peripheral portion 62 are disposed in roughly the same position (height). Therefore, the outer face 16*b* of the peripheral portion 62 and the inclined surface 91*c* of the constrained layer 91 are disposed to be roughly continuous to each other. In other words, the outer face 16*b* and the inclined surface 91*c* are substantially connected to each other in such a way that an angle between the outer face 16*b* and the inclined surface 91*c* is an obtuse angle.

The double-sided tape 73 causes the outer cover 17 to be stuck on the inner cover 16, the constrained layer 81, and the constrained layer 91. For example, the double-sided tape 73 adheres to the outer face 16*b* of the inner cover 16, the flat face 81*b* and the inclined surface 81*c* of the constrained layer 81, and the flat face 91*b* and the inclined surface 91*c* of the constrained layer 91. Stated another way, the double-sided tape 73 bonds the outer cover 17 to the inclined surface 81*c* of the constrained layer 81, and also bonds the outer cover 17 to the inclined surface 91*c* of the constrained layer 91.

The outer cover 17 is thinner and less rigid than the inner cover 16. Therefore, the outer cover 17 is stuck on the inner cover 16, the constrained layer 81, and the constrained layer 91 by using the double-sided tape 73, and therefore the outer cover 17 deforms along the outer face 16*b* of the inner cover 16, the flat face 81*b* and the inclined surface 81*c* of the constrained layer 81, and the flat face 91*b* and the inclined surface 91*c* of the constrained layer 91. The double-sided tape 73 performs setting in such a way that a distance between the outer cover 17 and the inner cover 16, the constrained layer 81, or the constrained layer 91 is roughly constant.

For example, the outer cover 17 includes a peripheral portion 101, a central portion 102, and an inclined portion 103. The peripheral portion 101 surrounds the central portion 102 and the inclined portion 103. The inclined portion 103 is provided between the peripheral portion 101 and the central portion 102.

The peripheral portion 101 is bonded to the outer face 16*b* of the base 61 and the peripheral portion 62 by using the double-sided tape 73. Therefore, the peripheral portion 101 is disposed along the outer face 16*b* of the base 61 and the peripheral portion 62. Note that the peripheral portion 101 may be partially bent.

The central portion 102 is bonded to the flat face 63*a* of the central portion 63, the flat face 81*b* of the constrained layer 81, and the flat face 91*b* of the constrained layer 91. Therefore, the central portion 102 is disposed along the flat face 63*a* of the central portion 63, the flat face 81*b* of the constrained layer 81, and the flat face 91*b* of the constrained layer 91. Note that the central portion 102 may be partially bent.

The inclined portion 103 is bonded to the inclined surface 63*c* of the central portion 63, the inclined surface 81*c* of the constrained layer 81, and the inclined surface 91*c* of the constrained layer 91 by using the double-sided tape 73. Therefore, the inclined portion 103 is disposed along the inclined surface 63*c* of the central portion 63, the inclined surface 81*c* of the constrained layer 81, and the inclined surface 91*c* of the constrained layer 91, and is inclined to the peripheral portion 101 and the central portion 102.

For example, vibration is input to the HDD 10 from the outside in some cases. In this case, the housing 11 vibrates, and vibration of the housing 11 is transmitted to the dampers 71 and 72. This causes the constrained layers 81 and 91 to vibrate in response to the housing 11. The viscoelastic material 82 deforms between the constrained layer 81 and the inner cover 16. Furthermore, the viscoelastic material 92 deforms between the constrained layer 91 and the inner cover 16. The viscoelastic materials 82 and 92 convert energy of vibration into heat, and therefore the dampers 71 and 72 damp vibration of the housing 11.

The constrained layers 81 and 91 are mounted on the outer cover 17 by using the double-sided tape 73. However, the outer cover 17 is thin, and is less rigid than the constrained layers 81 and 91. Therefore, the outer cover 17 follows vibration of the constrained layers 81 and 91 to deform. In other words, even in a case where the constrained layers 81 and 91 are mounted on the outer cover 17, the constrained layers 81 and 91 can vibrate in response to the housing 11.

The damper 71 damps vibration that has been input to the housing 11, near the magnetic disks 31. Therefore, the damper 71 can damp vibration that is to be input to the magnetic disks 31 or vibration that is to be input to the HSA 33 near the magnetic disks 31.

The damper 72 damps vibration that has been input to the housing 11, near the VCM 34. Therefore, the damper 72 can damp vibration that is to be input to the HSA 33 near the VCM 34.

The dampers 71 and 72 damp vibration of the HSA 33, and therefore the HDD 10 can precisely position the magnetic head 45, even if recording density is high. Stated another way, the HDD 10 can improve recording density.

The outer cover 17 is welded to the base 15, and the seal 29 seals the vent hole 28. Therefore, the outer cover 17 and the seal 29 prevent helium in the housing space S and the clearance G from leaking out. However, for example, a change in atmospheric pressure generates a pressure difference between the outside of the housing 11, and the housing space S and the clearance G in some cases.

The clearance G is provided with a space that is defined by, for example, the outer cover 17, the outer face 16*b* of the inner cover 16, and the constrained layer 81 in some cases. Furthermore, the clearance G is provided with a space that is defined by, for example, the outer cover 17, the outer face 16*b* of the inner cover 16, and the constrained layer 91 in some cases. The outer cover 17 floats (is separated) from the inner cover 16 and the constrained layers 81 and 91, and therefore a space is generated. For example, in a case where a shape of the outer cover 17 is not provided along the outer face 16*b* of the inner cover 16, the flat face 81*b* and the inclined surface 81*c* of the constrained layer 81, and the flat face 91*b* and the inclined surface 91*c* of the constrained layer 91, a space becomes larger.

Helium is present in the space. Therefore, if the pressure difference causes helium in the space to expand, stress is applied to the vicinity of the space of the outer cover 17 or a portion where the outer cover 17 has been welded to the base 15 in some cases.

In the present embodiment, the outer cover 17 is provided along the outer face 16*b* of the inner cover 16, the flat face 81*b* and the inclined surface 81*c* of the constrained layer 81, and the flat face 91*b* and the inclined surface 91*c* of the constrained layer 91. Therefore, for example, the outer cover 17 is less likely to float (be separated) from the inner cover 16 and the constrained layer 81. Furthermore, the outer cover 17 is less likely to float from the inner cover 16 and the constrained layer 91. Accordingly, a space is prevented from being generated, or a space is made smaller, and therefore helium in the space has a small volume even if helium has expanded, and stress is less likely to be applied to the outer cover 17.

In the HDD 10 according to the present embodiment described above, the housing 11 includes the base 15, the inner cover 16, and the outer cover 17. The base 15 is provided with the housing space S where the magnetic disks 31 are disposed. The inner cover 16 is mounted on the base 15 to cover the housing space S. The outer cover 17 is mounted on the base 15 to cover the inner cover 16. The constrained layers 81 and 91 include the bottom faces 81*a* and 91*a* and the inclined surfaces 81*c* and 91*c*. The bottom faces 81*a* and 91*a* face the inner cover 16. The inclined surfaces 81*c* and 91*c* are located opposite to the bottom faces 81*a* and 91*a*, face the outer cover 17, and are inclined to the bottom faces 81*a* and 91*a*. The viscoelastic materials 82 and 92 are interposed between the bottom faces 81*a* and 91*a* and the inner cover 16.

When vibration has been generated in the HDD 10, the vibration is input to the constrained layers 81 and 91. When the constrained layers 81 and 91 have vibrated, the viscoelastic materials 82 and 92 deform between the inner cover 16 and the constrained layers 81 and 91, and convert energy of vibration into heat. This causes the constrained layers 81 and 91 and the viscoelastic materials 82 and 92 to damp vibration of the HDD 10 as the dampers 71 and 72. If the constrained layers 81 and 91 have a constant thickness, the constrained layers 81 and 91 are mounted on the inner cover 16 to roughly perpendicularly protrude from the outer face 16*b* of the inner cover 16 in some cases. Stated another way, the end faces 81*d* and 91*d* of the constrained layers 81 and 91 extend greatly and roughly perpendicularly from the outer face 16*b* of the inner cover 16. In this case, the outer cover 17 floats (is separated) from corner portions between the end faces 81*d* and 91*d* of the constrained layers 81 and 91 and the outer face 16*b* of the inner cover 16, and spaces that are surrounded by the end faces 81*d* and 91*d* of the constrained layers 81 and 91, the outer face 16*b* of the inner cover 16, and the outer cover 17 are generated. However, in the present embodiment, the inclined surfaces 81*c* and 91*c* are inclined, and therefore thicknesses of the constrained layers 81 and 91 decrease. Therefore, the constrained layers 81 and 91 enable the inclined surfaces 81*c* and 91*c* and the outer face 16*b* of the inner cover 16 to be disposed to be roughly continuous to each other, or enable a reduction in size of the spaces surrounded by the end faces 81*d* and 91*d* of the constrained layers 81 and 91, the outer face 16*b* of the inner cover 16, and the outer cover 17. Accordingly, the HDD 10 according to the present embodiment can prevent a space from being generated between the inner cover 16 and the outer cover 17, and this can prevent stress from being applied to the outer cover 17 due to expansion or contraction of gas in the space.

The inner cover 16 is provided with the vent hole 27. The vent hole 27 causes the clearance G between the inner cover 16 and the outer cover 17 to communicate with the housing space S. The outer cover 17 is provided with the vent hole 28. The vent hole 28 causes the clearance G to communicate with the outside, and is sealed by the seal 29. The constrained layers 81 and 91 and the viscoelastic materials 82 and 92 are disposed in the clearance G. The housing space S and the clearance G are filled with gas that is different from air. The seal 29 seals the vent hole 28, and therefore a pressure difference is generated between air of the outside and gas in the housing space S and the clearance G in some cases. The pressure difference causes gas in the space to expand or contract. However, the HDD 10 according to the present embodiment can prevent the space from being generated, and therefore stress can be prevented from being applied to the outer cover 17 due to expansion or contraction of gas in the space.

The outer cover 17 is welded to the base 15. If gas in the space expands or contracts, stress is applied to a portion where the outer cover 17 has been welded to the base 15. However, the HDD 10 according to the present embodiment can prevent the space from being generated, and therefore stress can be prevented from being applied to the portion where the outer cover 17 has been welded to the base 15 due to expansion or contraction of gas in the space.

The magnetic disks 31 are configured to rotate around the central axis Axd. The constrained layer 81 extends around the central axis Axd. Therefore, the constrained layer 81 and the viscoelastic material 82 can effectively damp vibration generated by the HSA 33 or the rotating magnetic disks 31.

The inclined surface 81*c* is inclined to the bottom face 81*a* in such a way that a distance between the bottom face 81*a* and the inclined surface 81*c* decreases outward in the radial direction that is orthogonal to the central axis Axd. Stated another way, the inclined surface 81*c* is a roughly conic curved surface. Therefore, in the HDD 10 according to the present embodiment, the outer cover 17 can be easily provided along the inclined surface 81*c*, and a space can be prevented from being generated between the inner cover 16 and the outer cover 17.

The outer diameter of the constrained layer 81 is smaller than the outer diameter of the magnetic disks 31. The inner cover 16 is provided with the recess Rd1 that houses the viscoelastic material 82 in some cases. The formation of the recess Rd1 causes the inner cover 16 to be located closer to the magnetic disks 31. However, a shape of the viscoelastic material 82 corresponds to a shape of the constrained layer 81, and therefore the outer diameter of the recess Rd1 can also be made smaller than the outer diameter of the magnetic disks 31. Accordingly, a distance can be provided between the inner cover 16 and the edges 31*a* of the magnetic disks 31, and for example, the inner cover 16 can be prevented from interfering with the edges 31*a* of the vibrating magnetic disks 31.

The double-sided tape 73 bonds the outer cover 17 to the inclined surfaces 81*c* and 91*c*. The double-sided tape 73 can pull the outer cover 17 toward the inclined surfaces 81*c* and 91*c*, and can deform the outer cover 17 along the inclined surfaces 81*c* and 91*c*. Therefore, in the HDD 10 according to the present embodiment, the outer cover 17 can be easily provided along the inclined surfaces 81*c* and 91*c*, and a space can be prevented from being generated between the inner cover 16 and the outer cover 17. Furthermore, the double-sided tape 73 is interposed between the outer cover 17 and the inclined surfaces 81*c* and 91*c*, and this can prevent a space from being generated between the outer cover 17 and the inclined surfaces 81*c* and 91*c*.

The HSA 33 includes the magnetic head 45 and the carriage 35. The magnetic head 45 is configured to read and write information from/to the magnetic disks 31. The carriage 35 is configured to move the magnetic head 45 around the central axis Axh. The VCM 34 rotates the carriage 35 around the central axis Axh. The constrained layer 91 overlaps the VCM 34 in a direction along the central axis Axh. Therefore, the constrained layer 91 and the viscoelastic material 92 can more effectively damp vibration generated by the VCM 34 rotating the HSA 33.

The base 15 includes the bottom face 21*a* and the side wall 22. The bottom face 21*a* faces the magnetic disks 31. The side wall 22 protrudes from the bottom face 21*a*, and surrounds the magnetic disks 31. The inclined surfaces 81*c* and 91*c* are inclined to the bottom faces 81*a* and 91*a* in such a way that distances between the bottom face 81*a* and 91*a* and the inclined surfaces 81*c* and 91*c* decrease toward the side wall 22. Therefore, the HDD 10 according to the present embodiment is more likely to prevent a space from being generated between the inner cover 16 and the outer cover 17 in comparison with a case where thicknesses of the constrained layers 81 and 91 decrease toward the center.

The constrained layers 81 and 91 include the end faces 81*d* and 91*d* that are provided at ends in a direction along the bottom faces 81*a* and 91*a* in the constrained layers 81 and 91. The inclined surfaces 81*c* and 91*c* are inclined to the bottom faces 81*a* and 91*a* in such a way that distances between the bottom faces 81*a* and 91*a* and the inclined surfaces 81*c* and 91*c* decrease toward the end faces 81*d* and 91*d*, and the inclined surfaces 81*c* and 91*c* are connected to the end faces 81*d* and 91*d*. Stated another way, neither a portion where the constrained layers 81 and 91 have a constant thickness nor a portion where the constrained layers

81 and 91 increase in thickness is provided between the inclined surfaces 81*c* and 91*c* and the end faces 81*d* and 91*d*. Therefore, the constrained layers 81 and 91 enable the inclined surfaces 81*c* and 91*c* and the outer face 16*b* of the inner cover 16 to be disposed to be roughly continuous to each other, or enable a reduction in size of spaces surrounded by the end faces 81*d* and 91*d* of the constrained layers 81 and 91, the outer face 16*b* of the inner cover 16, and the outer cover 17. Accordingly, the HDD 10 according to the present embodiment can prevent a space from being generated between the inner cover 16 and the outer cover 17. Furthermore, in general, the constrained layers 81 and 91 are thin, and therefore the constrained layers 81 and 91 are less likely to be manufactured to have a complicated shape. The constrained layers 81 and 91 according to the present embodiment can be easily formed in comparison with a case where the constrained layers 81 and 91 have a constant thickness or increase in thickness between the inclined surfaces 81*c* and 91*c* and the end faces 81*d* and 91*d*.

The inner cover 16 is provided with the recesses Rd1 and Rd2. At least a portion of the constrained layers 81 and 91 and the viscoelastic materials 82 and 92 are housed in the recesses Rd1 and Rd2. Therefore, the constrained layers 81 and 91 enable the inclined surfaces 81*c* and 91*c* and the outer face 16*b* of the inner cover 16 to be disposed to be roughly continuous to each other, or enable a reduction in size of spaces surrounded by the end faces 81*d* and 91*d* of the constrained layers 81 and 91, the outer face 16*b* of the inner cover, and the outer cover 17. Accordingly, the HDD 10 according to the present embodiment can prevent a space from being generated between the inner cover 16 and the outer cover 17.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk device comprising:

a magnetic disk;

a housing that includes a base, a first cover, and a second cover, the base being provided with a housing space in which the magnetic disk is disposed, the first cover being mounted on the base to cover the housing space, the second cover being mounted on the base to cover the first cover;

a constrained layer that includes a first face and a second face, the first face facing the first cover, the second face being located opposite to the first face, facing the second cover, and being inclined to the first face; and a first adhesive material that is interposed between the first face and the first cover, wherein the magnetic disk is configured to rotate around a first rotation axis, the constrained layer extends around the first rotation axis, and an outer diameter of the constrained layer is smaller than an outer diameter of the magnetic disk.

2. The disk device according to claim 1, further comprising a sealing material, wherein the first cover is provided with a first vent hole that connects a clearance between the first cover and the second cover to the housing space, the second cover is provided with a second vent hole that connects the clearance to an outside, and is sealed by the sealing material, the constrained layer and the first adhesive material are disposed in the clearance, and the housing space and the clearance are filled with gas that is different from air.

3. The disk device according to claim 1, wherein the second cover is welded to the base.

4. The disk device according to claim 1, wherein the second face is inclined to the first face in such a way that a distance between the first face and the second face decreases outward in a radial direction that is orthogonal to the first rotation axis.

5. The disk device according to claim 1, further comprising a second adhesive material that bonds the second cover to the second face.

6. The disk device according to claim 1, further comprising:

a head stack assembly that includes a magnetic head and a carriage, the magnetic head being configured to read and write information from or to the magnetic disk, the carriage being configured to move the magnetic head around a second rotation axis;

a voice coil motor that rotates the carriage around the second rotation axis; and a second constrained layer overlapping the voice coil motor in a direction along the second rotation axis.

7. The disk device according to claim 1, wherein the base includes a bottom face and a side wall, the bottom face facing the magnetic disk, the side wall protruding from the bottom face, and surrounding the magnetic disk, and the second face is inclined to the first face in such a way that a distance between the first face and the second face decreases toward the side wall.

8. The disk device according to claim 1, wherein the constrained layer includes an end face that is provided at an end of the constrained layer in a direction along the first face, and the second face is inclined to the first face in such a way that a distance between the first face and the second face decreases toward the end face, and is connected to the end face.

9. The disk device according to claim 1, wherein the first cover is provided with a recess, and at least a portion of the constrained layer and the first adhesive material are housed in the recess.

* * * * *